United States Patent
Park et al.

(10) Patent No.: US 9,619,807 B2
(45) Date of Patent: Apr. 11, 2017

(54) GENUINE PRODUCT CERTIFICATION MEANS AND SYSTEM

(71) Applicant: ICRAFT CO., LTD., Seoul (KR)

(72) Inventors: Woojin Park, Seoul (KR); Youngjoon Song, Seoul (KR); Joopyo Hong, Seoul (KR)

(73) Assignee: ICRAFT CO., LTD., Seoul (KR)

( * ) Notice: Subject to any disclaimer, the term of this patent is extended or adjusted under 35 U.S.C. 154(b) by 70 days.

(21) Appl. No.: 14/851,034

(22) Filed: Sep. 11, 2015

(65) Prior Publication Data

US 2016/0379223 A1  Dec. 29, 2016

(51) Int. Cl.
G06K 19/06 (2006.01)
G06K 9/74 (2006.01)
G06Q 30/00 (2012.01)

(52) U.S. Cl.
CPC ... *G06Q 30/0185* (2013.01); *G06K 19/06028* (2013.01); *G06K 19/06037* (2013.01)

(58) Field of Classification Search
CPC ............ G06K 19/06; G06K 19/06028; G06K 19/06037; G06K 9/74
USPC .......................................................... 356/71
See application file for complete search history.

(56) References Cited

U.S. PATENT DOCUMENTS

| | | | |
|---|---|---|---|
| 2004/0151880 A1* | 8/2004 | Nakamura | B41M 3/14 428/195.1 |
| 2005/0024626 A1* | 2/2005 | Faris | B42D 25/29 356/71 |
| 2008/0130018 A1* | 6/2008 | Steenblik | G06K 19/02 356/625 |

FOREIGN PATENT DOCUMENTS

| | | |
|---|---|---|
| KR | 10-0785765 B1 | 12/2007 |
| KR | 10-2013-0131945 A | 12/2013 |
| KR | 10-2015-0048334 A | 5/2015 |

* cited by examiner

*Primary Examiner* — Roy M Punnoose
(74) *Attorney, Agent, or Firm* — Rabin & Berdo, P.C.

(57) ABSTRACT

Disclosed is a genuine product certification system, including: a genuine product certification means, including: an optical material; additional information; and patterns for genuine product certification; a user terminal adapted to perform genuine product certification using the genuine product certification means; a service server including information about the patterns, the spectrum of the optical material, and the additional information as existing data, and adapted to perform genuine product certification using a result of performing genuine product certification using the user terminal and to generate statistical data concerning the occurrence of imitation products; and a manager terminal adapted to receive and output information about performance of the genuine product certification by the service server and the statistical data concerning the occurrence of imitation products transmitted from the service server.

16 Claims, 4 Drawing Sheets

GENUINE PRODUCT CERTIFICATION MEANS AND SYSTEM

SPECIFIC REFERENCE TO A GRACE PERIOD INVENTOR DISCLOSURE

This invention has been published by the internet newspaper on Feb. 11 and Mar. 13, 2015, by the inventor or joint inventors.

BACKGROUND OF THE INVENTION

Field of the Invention

The present invention relates, in general, to a genuine product certification means and a genuine product certification system.

Description of the Related Art

In order to distinguish genuine products from imitation products (forgeries), elements for certifying genuine products have been developed.

As one example, a seller who sells genuine products provides a serial number with the genuine products to be subject to sale, or attaches hologram stickers to respective genuine products, thereby establishing a system for performing genuine product certification.

However, in spite of the presence of the conventional genuine product certification method and system, forgery and falsification techniques have been gradually increasing, thereby causing various cases involving damage to sellers who sell genuine products and purchasers who buy imitation products.

Furthermore, a technique for tracking the distribution channel of corresponding genuine products using a method and system for certifying genuine products is already disclosed in Korean Patent No. 0785765 entitled 'Genuine Product Certification Method and Apparatus'.

However, since the granted patent cannot fundamentally prevent a label including radio frequency identification tag and unique identification information from being forged or falsified, the development of a label that cannot be easily forged or falsified is needed.

SUMMARY OF THE INVENTION

Accordingly, the present invention has been made keeping in mind the above problems occurring in the related art, and an object of the present invention is to provide a genuine product certification means and a genuine product certification system using the genuine product certification means, which can prevent the forgery or falsification of genuine products by applying various security technologies.

Another object of the present invention is to provide a genuine product certification means and a genuine product certification system, which are intended to monitor the forgery or falsification of products and to improve product development using the statistical data of purchasers by checking the distribution channels of objects to be subject to genuine product certification using events occurring at the time of performing the genuine product certification, and by establishing a genuine product certification system whereby the statistics of purchasers are calculated using the information in a user terminal that has performed the genuine product certification.

In order to achieve the above object, according to one aspect of the present invention, there is provided a genuine product certification means, including: an optical material applied on at least a part of the surface of a sticker attached to an object to be subject to genuine product certification and reflecting incident light a specific spectrum included upon reflection of the incident light; additional information formed in a pattern shape on at least a part of the surface of the sticker attached to the object to be subject to genuine product certification, and including information about a product to be subject to genuine product certification; and patterns for genuine product certification of the object to be subject to genuine product certification, randomly patterns on the at least a part of the surface of the sticker attached to the object to be subject to genuine product certification.

The genuine product certification means may further include a hologram that is formed on at least a part of the surface of the sticker attached to the object to be subject to genuine product certification and reflects different kinds of light according to the angle, the hologram being formed in a logo or word form of the product to be subject to genuine product certification.

In one example, the optical material may be a specific optical ink.

In one example, the optical material may be a glass material.

The optical material may be applied only to the upper portion of a pattern shape of the additional information.

The additional information may include at least one piece of information among information about the manufacturing date, the product number, the product content, the sale store, and the warranty period of the product to be subject to genuine product certification.

The additional information may be of one-dimensional bar code form or of two-dimensional bar code form.

According to another aspect of the present invention, there is provided a genuine product certification system, including: a genuine product certification means, including: an optical material applied on at least a part of the surface of a sticker attached to an object to be subject to genuine product certification and reflecting incident light a specific spectrum included upon reflection of the incident light; additional information formed in a pattern shape on at least a part of the surface of the sticker attached to the object to be subject to genuine product certification, and including information about a product to be subject to genuine product certification; and patterns for genuine product certification of the object to be subject to genuine product certification, randomly formed on the at least a part of the surface of the sticker attached to the object to be subject to genuine product certification; a user terminal adapted to perform genuine product certification using the genuine product certification means; a service server including information about the patterns, the spectrum of the optical material, and the additional information as existing data, and adapted to perform genuine product certification using a result of performing genuine product certification using the user terminal and to generate statistical data concerning the occurrence of imitation products; and a manager terminal adapted to receive and output information about the performance of the genuine product certification by the service server and the statistical data concerning the occurrence of imitation products transmitted from the service server.

The user terminal and the manager terminal may be connected to the service server via an internet connection.

The user terminal may include: a data obtaining unit adapted to capture the genuine product certification means and to obtain video data and still image data; and a data comparing unit adapted to compare the video data and the still image data obtained from the data obtaining unit with the existing data of the service server and to determine whether or not the genuine product certification means is authentic.

The user terminal may further include a light outputting unit adapted to radiate light on the genuine product certification means.

The data comparing unit may include: an obtained data processing part adapted to process the video data obtained from the data obtaining unit and to separate an image portion for pattern recognition and an image portion for additional information recognition from the video data, and adapted to process the still image data and to separate a spectrum from the still image data; a pattern comparing part adapted to receive the image portion for the pattern recognition transmitted from the obtained data processing part and to compare the image portion with the existing data of the service server, thereby determining whether or not the patterns are authentic; and an additional information and spectrum comparing part adapted to receive the image portion for the additional information recognition and the spectrum transmitted from the obtained data processing part and to compare the image portion and the spectrum with the existing data of the service server, thereby determining whether or not information about a product to be subject to genuine product certification, included in the additional information, and the spectrum are consistent with the existing data.

The spectrum of the optical material provided in the service server as the existing data may be formed and stored in a predetermined range, and the additional information and spectrum comparing part may determine that the optical material having the relevant spectrum is a genuine product when the spectrum extracted from the still image is included in the range stored in the service server.

The service server may include: a database unit having information about the spectrum of the optical material, the additional information, and information about genuine patterns of the patterns as existing data; and a statistical data generation unit adapted to generate statistical data concerning performance of genuine product certification and the occurrence of imitation products using a result of performing genuine product certification using the user terminal, wherein the statistical data generation unit generates statistical data using at least one piece of information selected from among information about the location of the user terminal that performed genuine product certification, information about the frequency of attempts to perform genuine product certification, information about the purchaser of a product to be subject to genuine product certification and determined as a genuine product, and information about the location of the user terminal that performed genuine product certification of a product to be subject to genuine product certification and determined as an imitation product.

The purchaser information of the product to be subject to genuine product certification and determined as a genuine product among various pieces of information used by the statistical data generation unit may be at least one piece of information, among information about ages, sexes, and purchase locations of purchasers, wherein information about ages, sexes, and purchase locations of purchasers are information inputted into the user terminal when the user terminal is connected to the service server to register as a member.

The manager terminal may output the statistical data concerning performance of the genuine product certification and the occurrence of imitation products transmitted from the service server in a graph, map, or chart form.

According to these features, since the genuine product certification means includes the optical material, the additional information and the patterns, it is effective in making forgery and falsification of the genuine product certification means more difficult.

Furthermore, since the genuine product certification system includes the genuine product certification means that is difficult to forge or falsify thanks to the constitution described above, the user terminal performing genuine product certification, and a service server, the genuine product certification can be easily performed using the genuine product certification means in the user terminal.

Also, since the service server of the genuine product certification system generates the statistical data by processing genuine product certification data, the manager terminal can monitor the status of genuine product certification and the status of occurrence of imitation products using the statistical data, or can monitor statistical data concerning purchasers.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, preferred embodiments of the present invention will be described in detail with reference to the accompanying drawings in a manner such that the present invention can be easily executed by those having ordinary skill in the art to which the present invention pertains. The present invention may, however, be embodied in many alternate forms, and should not be construed as limited only to the example embodiments of the present invention set forth herein. In the following description, it is to be noted that, when the functions of conventional elements and the detailed description of elements related with the present invention may make the gist of the present invention unclear, a detailed description of those elements will be omitted. Wherever possible, the same reference numerals will be used throughout the drawings and the description to refer to the same or like parts.

A genuine product certification means according to one embodiment of the present invention will be described with reference to the accompanying drawings.

The structure of the genuine product certification means according to one embodiment of the present invention will be described with reference to FIG. 1. The genuine product certification means 10 includes: a sticker 11 attached to an object to be subject to genuine product certification; patterns 12 formed on a top surface of the sticker 11; additional information 13; and an optical material 14 applied on the top surface of the sticker 11.

The sticker 11 may be attached to the object to be subject to genuine product certification via one surface coated with an adhesive, and as described above, the patterns 12, the additional information 13 and the optical material 14 are formed on the top surface of the sticker 11, which is the other surface, which is not coated with an adhesive.

Figure 1:
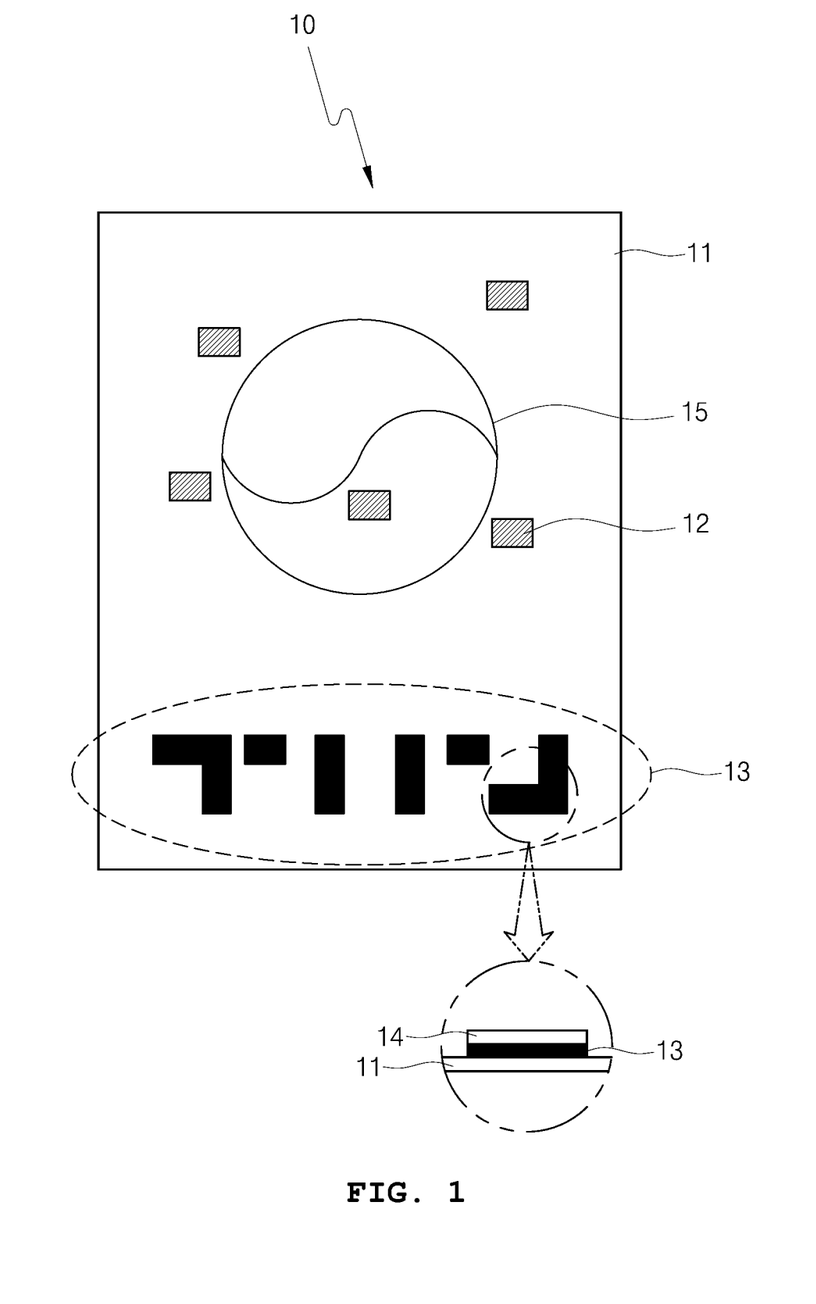
FIG. 1 is a view showing a genuine product certification means according to one embodiment of the present invention.

At this time, as illustrated in FIG. 1, the sticker 11 may be formed to have a quadrangular shape. However, in other embodiments, the sticker may be also formed in a circular shape. The shape of the sticker 11 is not limited thereto.

As described above, the patterns 12 are formed at the upper portion of the top surface of the sticker 11 and are used when the genuine product certification means 10 distinguishes genuine products from imitation products. The patterns may be configured such that a plurality of patterns are formed at random positions.

As one example, the plurality of patterns 12 may be formed in different pattern shapes, and a pattern structure including the plurality of patterns 12 may be configured such that one pattern structure corresponds to one object to be subject to genuine product certification.

The pattern structure composed of the plurality of patterns 12 is used when determining whether or not the object to be subject to genuine product certification 10 having the structure of the corresponding patterns 12 is genuine because the entire structure of the patterns becomes an object for comparison when the structure is captured as a picture.

Also, the plurality of patterns 12 may be security patterns that are marked to make them difficult to notice with the naked eye, and may be patterns that are produced and formed so that the authenticity of the patterns can be confirmed only when a video in which the patterns are captured is analyzed in frame by frame format.

Furthermore, at this time, a logo 15 may be formed at the upper portion of the top surface of the sticker corresponding to the portion where the plurality of patterns 12 is formed.

In one example, the logo 15 may be further included as a brand logo of the seller or a picture of text indicating the seller.

Furthermore, the additional information 13 may be formed at the lower portion of the top surface of the sticker 11 and may be formed as an encoded code, thereby including information about the product to be subject to genuine product certification.

As one example, with regard to the additional information 13, which is an encoded code, encoded patterns resulting from encoding, performed upon forming the additional information on the upper surface of the sticker 11, and decoding, performed by recognizing the corresponding additional information 13, are separately set.

At this time, one decoding algorithm for decoding the additional information 13 in an encoded code form may correspond to one algorithm, which forms the additional information 13 on the top surface of the sticker 11.

In one example, the additional information 13 is formed as a one-dimensional bar code, and a quick response code (QR code), which is a two-dimensional bar code, thereby including information about the product to be subject to genuine product certification.

Furthermore, at this time, the additional information 13 includes at least one piece of information selected from among information about the manufacturing date, the product number, the product content, the sale store, the warranty period of the product to be subject to genuine product certification, and the like.

This additional information 13 may be formed in a hologram form, in which different beams are reflected depending on the angle.

The optical material 14 is applied on the top surface of the sticker 11. In one example, the optical material 14 may be applied on a portion of the top surface of the sticker 11, or may be applied on the entire top surface of the sticker 11.

At this time, when the optical material 14 is formed to be applied on a portion of the top surface of the sticker 11, the optical material 14 may be applied on the upper portion of the additional information 13 on the top surface of the sticker 11.

When the optical material 14 is formed to be applied on the upper portion of the additional information 13, as shown in the enlarged view illustrated in FIG. 1, the side of the genuine product certification means 10 may be formed in a structure in which the additional information 13 is located in the upper portion of the sticker 11, and the optical material 14 is applied on the upper portion of the additional information 13.

The optical material 14 may be a special optical ink which is a chemical material. In one example, the optical material 14 may be a glass material.

The optical material 14 reflects incident light and causes reflections by including a unique wavelength, namely, a specific spectrum, according to each color included in the applied special optical ink.

As one example, when reflecting incident light, the optical material 14 is formed to include a wavelength of 400 nm. Thus, when the optical material is applied on the upper portion of the sticker 11, the corresponding optical material 14 reflects the wavelength of 400 nm while reflecting the incident light that is incident from an external light source.

As another example, the optical material 14 is formed to include a wavelength of 660 nm, thereby reflecting the wavelength of 660 nm when reflecting the light from the light source that is incident from the outside.

In this way, since the optical material 14 is formed in a structure in which a specific wavelength is output, the corresponding optical material is analyzed in order to obtain the wavelength, thereby serving as one indicator for conducting genuine product certification.

Since the genuine product certification means 10 according to one embodiment of the present invention, which is formed in such a structure, includes the sticker 11, the patterns 12 formed on the upper surface of the sticker, the additional information 13, and the optical material 14, the genuine product certification means undertakes a complicated genuine product certification procedure. Due to this, it is complicated and hard to forge or falsify the genuine product certification means 10.

Furthermore, since it is difficult to falsify the genuine product certification means 10 according to one embodiment of the present invention, it is also hard to reproduce the genuine product certification means to be attached to the product to be subject to genuine product certification. Thus, it is effective in preventing forged or falsified imitation products from being produced.

Next, the structure of a genuine product certification system according to one embodiment of the present invention will be described with reference to FIGS. 1 to 4.

Figure 2:
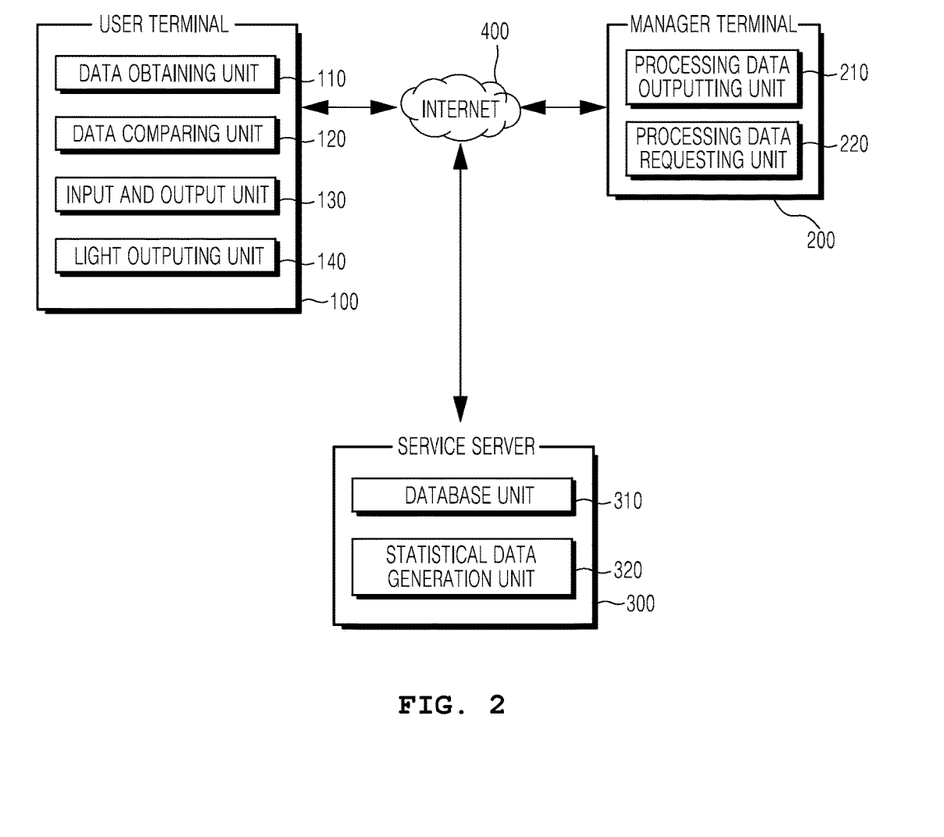
FIG. 2 is a block diagram showing the structure of a genuine product certification system according to one embodiment of the present invention.

As illustrated in FIG. 2, a genuine product certification system according to one embodiment of the present invention includes: a user terminal 100 and a manager terminal 200 connected to the internet 400; and a service server 300 connected to the internet 400 and adapted to provide information to or to receive information from the user terminal 100 and the manager terminal 200.

The user terminal 100 may be a terminal by which a genuine product process is directly performed. As one example, the user terminal may be a terminal possessed by a purchaser who bought a product to be subject to genuine product certification.

In one example, as a terminal which can be connected to the internet 400, the user terminal 100 may be a portable electronic device, such as a smart phone, a tablet PC, a notebook computer, or the like.

The user terminal 100 is a terminal that performs genuine product certification using the genuine product certification means 10 according to one embodiment of the present invention, previously described with reference to FIG. 1. When describing the detailed description herein, the case in which the user terminal 100 is a smart phone will be hereinafter described as an example.

At this time, the user terminal 100 includes: a data obtaining unit 110; a data comparing unit 120; an input and output unit 130; and a light outputting unit 140, wherein the data obtaining unit 110 is a camera adapted to capture the genuine production certification means 10 and to obtain video data and still image data.

At this time, the data obtaining unit 110 may obtain the still image data by dividing the obtained video data into individual frames, or may obtain the still image data by capturing a still image.

The data comparing unit 120 receives the video data and the still image data transmitted from the data obtaining unit and receives existing data from the service server 300, thereby determining whether or not the genuine product certification means 10 is authentic by comparing information included in the video data and the still image data with the existing data received from the service server 300.

The input and output unit 130 is a touch input and output unit of the user terminal 100 in a smart phone form, and receives an input signal applied from the outside, or outputs, as a picture, an action for genuine product certification performed by the user terminal 100.

Furthermore, as a light source for outputting light upon capturing the genuine product certification means 10 using the user terminal 100, the light outputting unit 140 may be a flashing device installed in a smart phone.

In the user terminal 100, a program exclusively used for genuine product recognition is installed in advance, wherein the program exclusively used for genuine product recognition may be uploaded in a program providing server by a business operator providing the genuine product certification system, and thereafter may be downloaded and installed in the user terminal 100.

The program exclusively used for genuine product recognition controls the data obtaining unit 110 and the light outputting unit 140 according to an input signal inputted in the input and output unit 130 of the user terminal 100. Furthermore, the program executes the data comparing unit 120 and controls output of the input and output unit 130 according to execution results of the data comparing unit 120.

In one example, the program exclusively used for genuine product recognition is stored and installed in a storage unit of the user terminal 100, and is executed in a processing unit of the user terminal, namely, a processor. The program exclusively used for genuine product recognition, which is executed in the processing unit of the user terminal 100, may be regarded as a processing operation performed in the data comparing unit 120.

Figure 3:
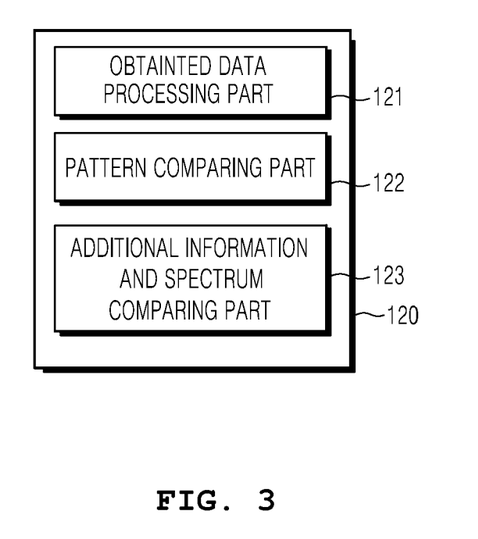
FIG. 3 is a block diagram showing the structure of a data comparison unit of a user terminal with regard to the genuine product certification system according to one embodiment of the present invention.

As such, a structure of the data comparing unit, which is installed and executed in the user terminal to perform genuine product recognition, will be described in greater detail with reference to FIG. 3. The data comparing unit 120 of the user terminal 100 includes: an obtained data processing part 121; a pattern comparing part 122; and additional information and spectrum comparing part 123.

First, the obtained data processing part 121 receives the video data and image data in a frame unit transmitted from the data obtaining unit 110, and separates an image portion for recognition of the patterns 12 and an image portion for recognition of the additional information 13 from the video data, separating a spectrum reflected from the optical material 12 from the still image data.

즉 That is, the obtained data processing part 121 performs processing for separating data, which will be used for analyzing whether or not the genuine product certification means is authentic, from the video data and the still image data obtained from the data obtaining unit 110.

Furthermore, the pattern comparing part 122 receives the image portion for recognition of the patterns 12 separated from the obtained data processing unit 121 and determines whether or not the patterns 12 included in the corresponding image portion are consistent with any one among comparative patterns 12 stored in the service server 300, thereby outputting information about whether or not the patterns 12 are authentic according to the result of conformity.

At this time, the comparative patterns compared by the pattern comparing unit 122 with the image portion for recognition of the separated patterns received from the obtained data processing part 121 may be genuine patterns stored in the service server 300. In a preferred example, the user terminal 100 is connected to the service server 300 through the internet so that pattern comparison with the genuine patterns stored in the service server 300 can be performed.

In one example, when the patterns included in the image portion for recognition of the separated patterns 12 received from the obtained data processing part are identical to the genuine patterns stored in the service server 300, the pattern comparing part 122 outputs a result in which the corresponding patterns 12 are judged to be authentic.

However, at this time, when the patterns included in the image portion for recognition of the separated patterns 12 are not identical to the genuine patterns stored in the service server 300, the pattern comparing part 122 outputs a result in which the corresponding patterns are judged not to be authentic.

Furthermore, the additional information and spectrum comparing part 123 receives the image portion for recognition of the additional information 13 separated from the obtained data processing unit 121, and the spectrum separated from the still image data, thereby recognizing the additional information 13. Furthermore, the additional information and spectrum comparing part 123 compares the recognized additional information with the additional information stored in the service server 300, thereby determining whether or not the additional information 13 is authentic, and determining whether or not the separated spectrum is authentic.

First, explaining the procedure for judgement as to whether or not the additional information 13 is authentic, the additional information and spectrum comparing part 123 decodes the additional information 13 in a code form using a fixed decoding algorithm, and compares additional information extracted by the decoding, such as information about the manufacturing date, the product number, the product content, the sale store, the warranty period, and the like, with the information stored in the service server 300, thereby determining whether or not the corresponding additional information 13 is authentic.

In one example, the case in which the additional information and spectrum comparing part 123 compares the information extracted by directly decoding the additional information 13 in a code form recognized from the video data with the information stored in the service server 300 has been described. However, in another example, the additional information and spectrum comparing part 123 may transmit the additional information 13 in a code form recognized from the video data to the service server 300 and may compare the information included by performing decoding processing in the service server 300, thereby determining whether or not the additional information 13 is authentic.

Furthermore, the additional information and spectrum comparing part 123 determines whether or not the spectrum separated from the still image data is authentic, thereby outputting information about whether or not the optical material is authentic. At this time, the spectrum separated from the still image data is a spectrum included in a wavelength reflected from the optical material 14 due to flashing of the user terminal 100 entered into the optical material 13 in a step in which the data obtaining unit 110 obtains the still image.

In one example, when the wavelength of the spectrum extracted from the still image is compared with wavelengths of the optical material 14 that is a genuine product to be applied on the genuine product certification means 10 stored in the service server 300, if these wavelengths are consistent with each other, the additional information and spectrum comparing part 123 outputs a result indicating that the corresponding optical material 14 is determined to be authentic.

However, at this time, when the corresponding wavelength included in the optical material 14 is not detected in the service server 300, or is not consistent with the wavelengths of the optical material applied on the corresponding genuine product certification means 10, the additional information and spectrum comparing part 123 outputs a result indicating that the corresponding optical material 14 is determined not to be authentic.

In the present embodiment, when a wavelength extracted from the still image data for processing the spectrum is 410 nm, and the wavelengths of the optical material of a genuine product stored in the service server are 395 nm-400 nm-410 nm, since the extracted wavelength of 410 nm is included in the range of the wavelengths of the optical material 14 that is a genuine product, the corresponding optical material 14 is determined as a genuine product.

In the same vein, in the case where the additional information and spectrum comparing unit 123 extracts a wavelength of 640 nm from the still image data, and the wavelength of the optical material, which is a genuine product stored in the service server 300, is in the range from 640 nm to 660 nm, since the extracted wavelength of 640 nm is included in the range of the wavelength of the optical material 14, the corresponding optical material 14 is determined as a genuine product.

As such, the data comparing unit 120 includes the obtained data processing part 121, the pattern comparing part 122, and the additional information and spectrum comparing part 123, thereby receiving the video data and still image data obtained from the data obtaining unit 110 and determining whether or not the patterns 12, the additional information 13 and the optical material 14 are authentic by comparing the video data and still image data with the existing data stored in the service server 300. Based on the result, the data comparing unit 120 determines whether or not the genuine product certification means 10 is authentic.

Furthermore, the data comparing unit 120 transmits to the input and output unit 130 the result of judgement as to whether or not the genuine product certification means 10 is authentic, and outputs the result, or transmits the result to the service server 300 using the internet, thereby storing it in the service server 300.

At this time, the data comparing unit 120 of the user terminal 100 transmits to and stores in the service server 300 information about the location of the user terminal 100, and information about the genuine product certification date of the user terminal 100, the manufacturing date of the product for which genuine product certification is requested, the product number, and the like.

Furthermore, the user terminal transmits the information about the sex and age of the person who requests genuine product certification to the service server and stores the information in the service server.

At this time, the information inputted in the user terminal 100 may be transmitted under an agreement governing the provision of personal information about the person who requests that the genuine product certification be performed. At this time, the information transmitted to and stored in the service server 300 may further include information about the location of the user terminal 100.

In one example, the user terminal 100 enables a user to join the service server as a member using a program exclusively used for genuine product recognition, and sex information, age information, location information, address information or e-mail information generated during the membership registration process is stored in the service server 300 through the internet 400.

In one example, the user terminal 100 may include a wireless communication module for connection to the internet 400. Preferably, the user terminal may be connected to the internet 400 via mobile communication in 3G or LTE form, or via wireless communication in Wi-Fi form.

Describing the structure of the service server 300 with reference to FIG. 2 again in detail, as previously described, the service server 300 is connected to the user terminal 100 and the manager terminal 200 via the internet 400 and includes a database unit 310 and a statistical data generation unit 320.

The database unit 310 may store information to be provided to the user terminal 100 or information to be provided to the manager terminal 200, or may store information transmitted from the user terminal 100.

In one example, the information to be provided from the database unit 310 to the user terminal 100 may be information about genuine patterns, which is the existing data, information about the wavelength of the optical material 14, which is a genuine product, or additional information.

At this time, the existing data may be information previously established by a business operator providing the genuine product certification system and may be information used for the discrimination of genuine products and corresponding to the product to be subject to genuine product recognition.

Furthermore, the information to be provided from the database unit 310 to the manager terminal 200 may be statistical data generated from the statistical data generation unit 330.

Also, the information received from the user terminal to the database unit 310 may be information about the result of discrimination as to whether or not the genuine product certification means 10 is authentic, information about the location of the user terminal, information about the date and time at which genuine product certification was performed by the user terminal 100, the manufacturing date of the product for which genuine product certification is requested, the product number, and the location of the store selling the product, information about the sex and age of the person who requests that genuine product certification be performed, or the like. These pieces of information may be stored in the database unit 310, and may be transmitted to the statistical data generation unit 320 for the generation of the statistical data.

The statistical data generation unit 320 calculates statistical data using the data transmitted from the database unit 310 and transmits the calculated statistical data to the manager terminal 200 via the internet 300.

At this time, the statistical data calculated by the statistical data generation unit 320 may include information about the location where genuine product certification is attempted, information about the frequency of attempts to perform genuine product certification, information about the purchaser (age, sex, and purchase location) of the product determined as a genuine product, information about the location of the user terminal 100 that performed genuine product certification on a relevant imitation product when a product is determined as an imitation product through genuine product certification, information about the shape of the product determined as the imitation product, or the like.

As an example, based on the statistical data generated from the statistical data generation unit 320, data concerning the location at which genuine product certification is attempted, data concerning the frequency of attempts to perform genuine product certification, statistical data concerning the ages, sexes, and purchase locations of buyers who bought a relevant product confirmed through genuine product certification, data concerning products determined to be imitation products, or data concerning the locations of the imitation products may be statistically confirmed.

Furthermore, the manager terminal 200 includes a processing data outputting unit 210 and a processing data requesting unit 220. Like the user terminal 100, the manager terminal may be a terminal connected to the service server 300 via the internet 400.

In one example, the manager terminal 200 may be a terminal, such as a computer device connected to the service server 300 via a wired network. However, in another example, the manager terminal 200 may be a portable electronic device connected to the service server 300 via a wireless network.

Furthermore, at this time, when the manager terminal 200 is a portable electronic device, like the user terminal, the manager terminal may be a smart phone connected to the internet 300 via mobile communication or wireless communication.

The processing data outputting unit 210 may be a display unit outputting statistical data received from the service server 300 via the internet 400.

At this time, the processing data outputting unit 210 may output statistical data received from the service server 300 as the processing data requesting unit 220 requests the transmission of the statistical data, which is data processed in the service server 300, to the service server. In another example, the processing data outputting unit 210 may receive and output the data even when the processing data requesting unit 220 does not request the processing data.

In one example, in the service server, in the case where data concerning products which are determined to be imitation products is included in various pieces of data received from the user terminal, the service server 300 may transmit a signal for the product determined as an imitation product to the manager terminal 200 immediately upon receiving data concerning products which are determined to be imitation products, and the data may be output by the processing data outputting unit 210.

At this time, when the service server 300 transmits the relevant signal data for the product determined as an imitation product to the manager terminal 200, information about the location of the user terminal 100 that performed genuine product certification of the imitation product corresponding to the signal data for the product determined as an imitation product, and information about the shape of the product to be subject to genuine product certification and determined as an imitation product may be further included.

Accordingly, the processing data outputting unit 210 may output the statistical data received from the service server 300, wherein the statistical data may be output as various kinds of graphs, data applied to a map, a chart, and the like.

Figure 4:
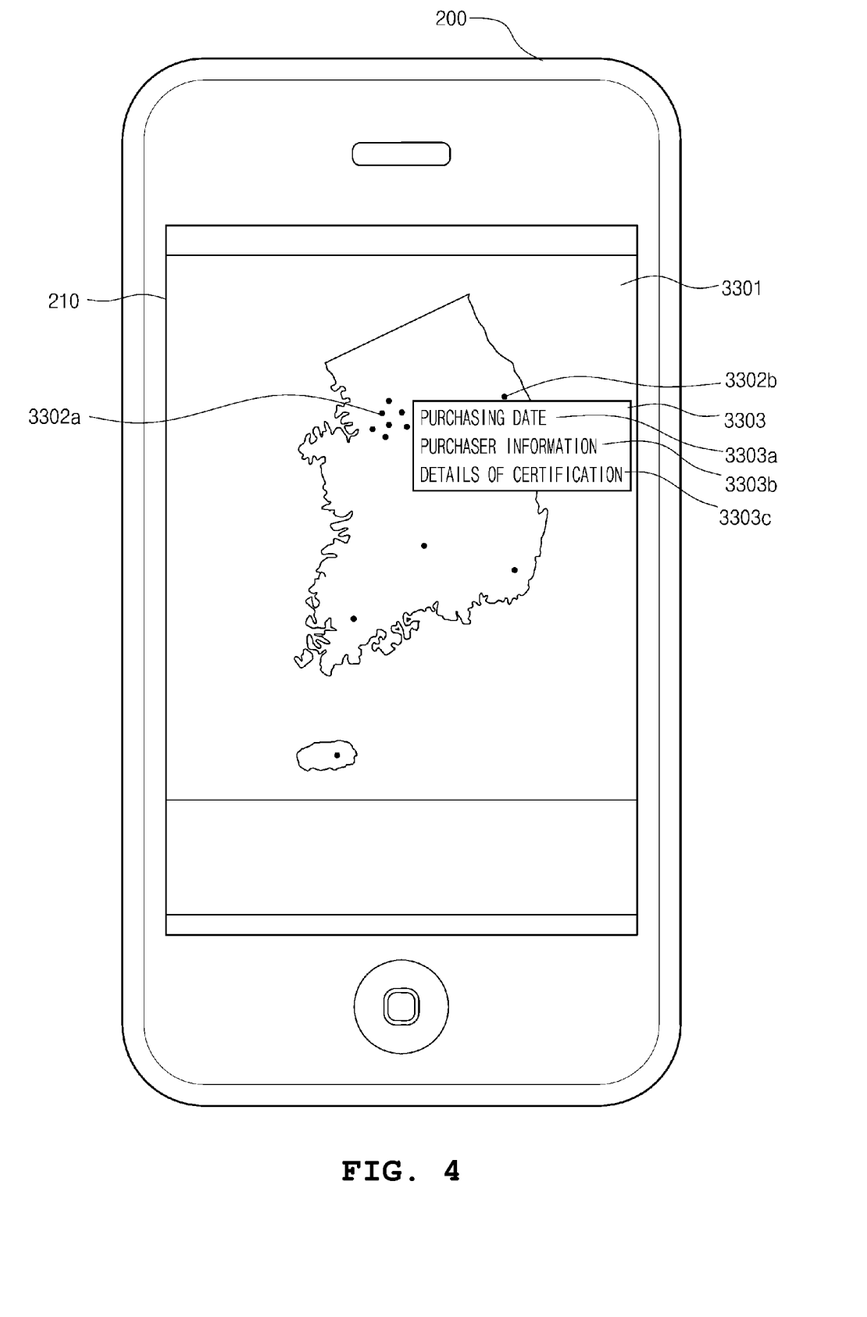
FIG. 4 is a view showing an output screen of the processing data output unit of a manager terminal with regard to the genuine product certification system according to one embodiment of the present invention.

Explaining one example, in which the manager terminal 200 outputs the statistical data received from the service server 300, with reference to FIG. 4, the processing data outputting unit 210 of the manager terminal 200 having the form of a portable electronic device displays the location of the user terminal 100 that requested genuine product certification as points 3302a, 3302b on a map.

Furthermore, when an input signal generated from the manager terminal 200, for example, a specific point 3302b, is selected, the result of genuine product certification corresponding to the selected point is output in the form of a pop-up 3303.

At this time, the pop-up 3303 may include information about the purchasing date 3303a, purchaser information 3303b, and information about the details of genuine product certification 3303c.

In this way, based on the current status of genuine product certification output from the manager terminal 200, data concerning genuine product certification performed by the user terminal may be confirmed.

In a preferred example, the manager terminal 200 may be a terminal that is connected to the service server 300 by forming a contract relationship with a business operator who would like to provide the genuine product certification system, or is able to receive the statistical data or data for the product determined as an imitation product from the service server 300.

As described above, the genuine product certification system according to one embodiment of the present invention captures the genuine product certification means 10 using the user terminal 100 and performs genuine product certification using data stored in the service server 300, storing the result of performing the genuine product certification in the service server 300.

Furthermore, the service server 300 generates statistical data concerning genuine product certification or concerning products determined to be imitation products using data generated from the user terminal 100 and the result of performing the genuine product certification, and the manager terminal 200 outputs the statistical data.

Accordingly, through the genuine product certification system according to one embodiment of the present invention, since the user terminal 100 performs genuine product certification using the patterns 12, the spectrum of the optical material 14, and the additional information 13, it is harder to forge or falsify the genuine product certification means 10 than a conventional hologram discrimination element or a genuine product discrimination element using a simple code. As a result, it is effective in improving the certainty of genuine product certification.

Furthermore, since the service server 300 statistically calculates the current status of products for which genuine product certification is requested and attempts to perform genuine product certification on imitation products, and the manager terminal 200 outputs the statistical data, the manager terminal 200 may monitor the current status of genuine product certification concerning the product to be subject to genuine product certification and the occurrence of imitation products. Thus, the forgery and falsification of genuine products can be prevented, and countermeasure can be rapidly taken in response to the occurrence of imitation products.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A genuine product certification means, comprising:
   an optical material applied on at least a part of the surface of a sticker attached to an object to be subject to genuine product certification and reflecting incident light with a specific spectrum included upon reflection of the incident light;
   additional information formed in a pattern shape on at least a part of the surface of the sticker attached to the object to be subject to genuine product certification, and including information about a product to be subject to genuine product certification; and
   patterns for genuine product certification of the object to be subject to genuine product certification, randomly formed on the at least a part of the surface of the sticker attached to the object to be subject to genuine product certification.

2. The genuine product certification means of claim 1, further comprising a hologram that is formed on at least a part of the surface of the sticker attached to the object to be subject to genuine product certification and reflects different kinds of light according to an angle, the hologram being formed in a logo or text form of the product to be subject to genuine product certification.

3. The genuine product certification means of claim 1, wherein the optical material is a specific optical ink.

4. The genuine product certification means of claim 1, wherein the optical material is a glass material.

5. The genuine product certification means of claim 1, wherein the optical material is applied only to an upper portion of a pattern shape of the additional information.

6. The genuine product certification means of claim 1, wherein the additional information includes at least one piece of information among information about a manufacturing date, a product number, a product content, a sale store, and a warranty period of the product to be subject to genuine product certification.

7. The genuine product certification means of claim 1, wherein the additional information is of one-dimensional bar code form, or of two-dimensional bar code form.

8. A genuine product certification system, comprising:
   a genuine product certification means, including: an optical material applied on at least a part of the surface of a sticker attached to an object to be subject to genuine product certification and reflecting incident light a specific spectrum included upon reflection of the incident light; additional information formed in a pattern shape on at least a part of the surface of the sticker attached to the object to be subject to genuine product certification, and including information about a product to be subject to genuine product certification; and patterns for genuine product certification of the object to be subject to genuine product certification, randomly formed on the at least a part of the surface of the sticker attached to the object to be subject to genuine product certification;
   a user terminal adapted to perform genuine product certification using the genuine product certification means;
   a service server including information about the patterns, and the spectrum of the optical material, and the additional information as existing data, and adapted to perform genuine product certification using a result of performing genuine product certification using the user terminal and to generate statistical data concerning occurrence of imitation products; and
   a manager terminal adapted to receive and output information about performing of the genuine product certification by the service server and the statistical data concerning the occurrence of imitation products transmitted from the service server.

9. The genuine product certification system of claim 8, wherein the user terminal and the manager terminal are connected to the service server via an internet connection.

10. The genuine product certification system of claim 8, wherein the user terminal comprises:
   a data obtaining unit adapted to capture the genuine product certification means and to obtain video data and still image data; and
   a data comparing unit adapted to compare the video data and the still image data obtained from the data obtaining unit with the existing data on the service server and to determine whether or not the genuine product certification means is authentic.

11. The genuine product certification system of claim 10, wherein the user terminal further comprises a light outputting unit adapted to radiate light on the genuine product certification means.

12. The genuine product certification system of claim 10, wherein the data comparing unit comprises:
   an obtained data processing part adapted to process the video data obtained from the data obtaining unit and to separate an image portion for pattern recognition and an image portion for additional information recognition from the video data, and adapted to process the still image data and to separate a spectrum from the still image data;
   a pattern comparing part adapted to receive the image portion for the pattern recognition transmitted from the obtained data processing part and to compare the image portion with the existing data of the service server, thereby determining whether or not the patterns are authentic; and
   an additional information and spectrum comparing part adapted to receive the image portion for the additional information recognition and the spectrum transmitted from the obtained data processing part and to compare the image portion and the spectrum with the existing data of the service server, thereby determining whether or not information about a product to be subject to genuine product certification included in the additional information and the spectrum are consistent with the existing data.

13. The genuine product certification system of claim 12, wherein the spectrum of the optical material provided in the service server as the existing data is formed and stored in a predetermined range, and the additional information and spectrum comparing part determines the optical material having the relevant spectrum to be a genuine product when the spectrum extracted from the still image is included in the range stored in the service server.

14. The genuine product certification system of claim 8, wherein the service server comprises: a database unit having information about the spectrum of the optical material, the additional information, and information about genuine patterns of the patterns as existing data; and a statistical data generation unit adapted to generate statistical data concerning performing of genuine product certification and the occurrence of imitation products using a result of performing genuine product certification using the user terminal, wherein the statistical data generation unit generates statistical data using at least one piece of information selected from among information about a location of the user terminal which performed genuine product certification, information about frequency of attempts to perform genuine product certification, purchaser information of a product to be subject to the genuine product certification and determined as a genuine product, and information about a location of the corresponding user terminal that performed genuine product certification of a product to be subject to the genuine product certification and determined as an imitation product.

15. The genuine product certification system of claim 14, wherein the purchaser information of the product to be subject to the genuine product certification and determined as a genuine product among various pieces of information used by the statistical data generation unit is at least one piece of information about ages, sexes, and purchase locations of purchasers, wherein information about ages, sexes, and purchase locations of purchasers are information inputted in the user terminal when the user terminal is connected to the service server to register as a member.

16. The genuine product certification system of claim 8, wherein the manager terminal outputs the statistical data concerning performing of the genuine product certification and the occurrence of imitation products transmitted from the service server in a graph, map, or chart form.

* * * * *